US012567764B2

(12) United States Patent
Sakamoto et al.

(10) Patent No.: US 12,567,764 B2
(45) Date of Patent: Mar. 3, 2026

(54) WIRELESS POWER TRANSFER SYSTEM

(71) Applicant: Murata Manufacturing Co., Ltd., Kyoto-fu (JP)

(72) Inventors: Norikazu Sakamoto, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 744 days.

(21) Appl. No.: 18/068,473

(22) Filed: Dec. 19, 2022

(65) Prior Publication Data

US 2023/0128671 A1     Apr. 27, 2023

Related U.S. Application Data

(63) Continuation of application No. PCT/JP2021/004030, filed on Feb. 4, 2021.

(30) Foreign Application Priority Data

Jun. 30, 2020     (JP) ................................. 2020-112476

(51) Int. Cl.
H02J 50/12          (2016.01)
H02J 50/70          (2016.01)
(Continued)

(52) U.S. Cl.
CPC .............. H02J 50/12 (2016.02); H02J 50/70 (2016.02); H02M 1/0003 (2021.05); H02M 1/36 (2013.01); H02M 3/015 (2021.05)

(58) Field of Classification Search
CPC .. H02J 50/12; H02J 50/70; H02J 50/80; H02J 7/02; H02J 50/10; H02M 1/0003; H02M 1/36; H02M 3/015
See application file for complete search history.

(56) References Cited

U.S. PATENT DOCUMENTS

| | | | |
|---|---|---|---|
| 2019/0296590 A1* | 9/2019 | Chae | H02J 7/02 |
| 2021/0175750 A1* | 6/2021 | Meyer | H02J 50/12 |
| 2022/0038015 A1* | 2/2022 | Liu | H02M 1/0058 |

FOREIGN PATENT DOCUMENTS

| | | |
|---|---|---|
| JP | 2013-183548 A | 9/2013 |
| JP | 2013-215065 A | 10/2013 |
| JP | 2017-028998 A | 2/2017 |

OTHER PUBLICATIONS

International Search Report issued in PCT/JP2021/004030; mailed Apr. 13, 2021.

* cited by examiner

*Primary Examiner* — Rexford N Barnie
*Assistant Examiner* — Thai H Tran
(74) *Attorney, Agent, or Firm* — Studebaker Brackett PLLC

(57) ABSTRACT

A wireless power transfer system comprises a power transmission device and a power reception device. The power reception device includes a power reception coil that wirelessly magnetically couples with a power transmission coil included in the power transmission device. The power transmission device includes a switching circuit in which switch elements perform switching operations, an input voltage adjustment circuit that is electrically connected to the switching circuit and adjusts an input voltage, and an MPU. The MPU is configured to recognize a power requirement presented by the power reception device, control the input voltage adjustment circuit and control intermittent oscillation of the switching circuit, and adjust the input voltage to prevent an oscillation stop period of the intermittent oscillation from exceeding a predetermined stop period.

20 Claims, 5 Drawing Sheets

101

(51) Int. Cl.
  *H02M 1/00*      (2007.01)
  *H02M 1/36*      (2007.01)
  *H02M 3/00*      (2006.01)

30

MPU

301

CLK

303

I/O

25

DRIVER

302 — TIMER

OSCILLATION PERIOD

OSCILLATION STOP PERIOD

INPUT VOLTAGE

. . . . .

INTERMITTENT PERIOD

INPUT VOLTAGE ADJUSTMENT: COARSE ADJUSTMENT

OSCILLATION PERIOD ADJUSTMENT: FINE ADJUSTMENT

TRANSMISSION POWER

CONTROL SETTING

OSCILLATION PERIOD ADJUSTMENT:
COARSE ADJUSTMENT

INPUT VOLTAGE ADJUSTMENT:
FINE ADJUSTMENT

WIRELESS POWER TRANSFER SYSTEM

CROSS-REFERENCE TO RELATED APPLICATIONS

This application claims benefit of priority to International Patent Application No. PCT/JP2021/004030, filed Feb. 4, 2021, and to Japanese Patent Application No. 2020-112476, filed Jun. 30, 2020, the entire contents of each are incorporated herein by reference.

BACKGROUND

Technical Field

The present disclosure relates to a wireless power transfer system made up of a power transmission device and a power reception device.

Background Art

The Japanese Unexamined Patent Application Publication No. 2013-215065 illustrates a power transmission system in which a power transmission device includes an alternating-current converter that performs alternating-current conversion of alternating-current power or direct-current power to be supplied, a power transmission side resonance coil that wirelessly transmits alternating-current power, and a power transmission side control device, and a power reception device includes a power reception side resonance coil, a rectifier, a direct-current converter, and a power reception side control device. Further, after being activated by receiving input of a control power supply voltage, the power reception side control device measures the output voltage of the rectifier and transmits to the power transmission side control device, and based on a measurement result of the output voltage of the rectifier, the power transmission side control device controls the alternating-current converter in such a way that the output voltage of the rectifier has a suitable value as the input voltage of the direct-current converter.

In general, in wireless power transfer systems, it is necessary to have the capability of controlling power being transmitted in order to adjust the reception power according to the transmission distance or the change in the state of a power supplying destination (load) over time. Particularly, in applications and systems handling a large amount of power, in view of safety of devices and controlling of temperature against heat generation due to power loss, it is desirable to have a power management having the capability of controlling transmission power with a high degree of accuracy.

SUMMARY

In response to a power requirement from the power reception device, a digital control unit (microcomputer or the like) of the power transmission device uses a technique that controls the power being transmitted by generating a signal for controlling the power being transmitted and adjusting the input voltage or an oscillation period.

In related art technologies for controlling the transmission power, a control signal has a digital value, and that will be discrete values. In order to control the transmission power in response to the power requirement from the power reception device, a continuous value or a highly accurate resolution is needed. However, the increment of adjustment values depends on the resolution of the DA conversion or the like, and thus it is difficult to perform the control with a highly accurate resolution. In the related art technologies, it is very difficult to perform the control of transmission power with a high degree of accuracy, and it is difficult to transmit high quality power.

Further, in the control of transmission power, if an oscillation stop period in an intermittent oscillation adjustment is extended, the reception power cannot be retained or maintained. Thus, the range of adjustment is limited. On the other hand, even in the adjustment where the range of adjustment of the input voltage is widened, the range of adjustment is also limited because of withstand voltage specifications of circuit components and the like. Because of such matters described above, in the related art technologies, it is very difficult to widen the range of the control of transmission power and transmit high quality power by only adjusting the intermittent oscillation or only adjusting the input voltage.

Therefore, the present disclosure provides a wireless power transfer system in which based on a power requirement presented by a power reception device, a power transmission device adjusts transmission power by recognizing the power requirement and performs the control of transmission power with high quality and high accuracy over a wide range of adjustment.

A wireless power transfer system that serves as an example of the present disclosure is a wireless power transfer system made up of a power transmission device and a power reception device. The power reception device includes a power reception coil that wirelessly magnetically couples with a power transmission coil included in the power transmission device. The power transmission device includes a switching circuit in which a switch element performs a switching operation, an input voltage adjustment circuit that is electrically connected to the switching circuit and adjusts an input voltage, and a digital control circuit. The digital control circuit has control capability of performing control of the input voltage adjustment circuit and control of intermittent oscillation of the switching circuit in accordance with a power requirement presented by the power reception device and performing adjustment of the input voltage in such a way that an oscillation stop period of the intermittent oscillation does not exceed a predetermined stop period.

According to the present disclosure, it becomes possible to provide a wireless power transfer system in which based on a power requirement presented by a power reception device, a power transmission device adjusts transmission power by recognizing the power requirement and performs the control of transmission power with high quality and high accuracy over a wide range of adjustment. Further, it becomes possible to provide a wireless power transfer system in which a power transmission device or a power reception device does not necessarily include a communication device and the power transmission device transmits power having high quality and high accuracy in accordance with a power requirement presented by the power reception device.

DETAILED DESCRIPTION

Figure 1:
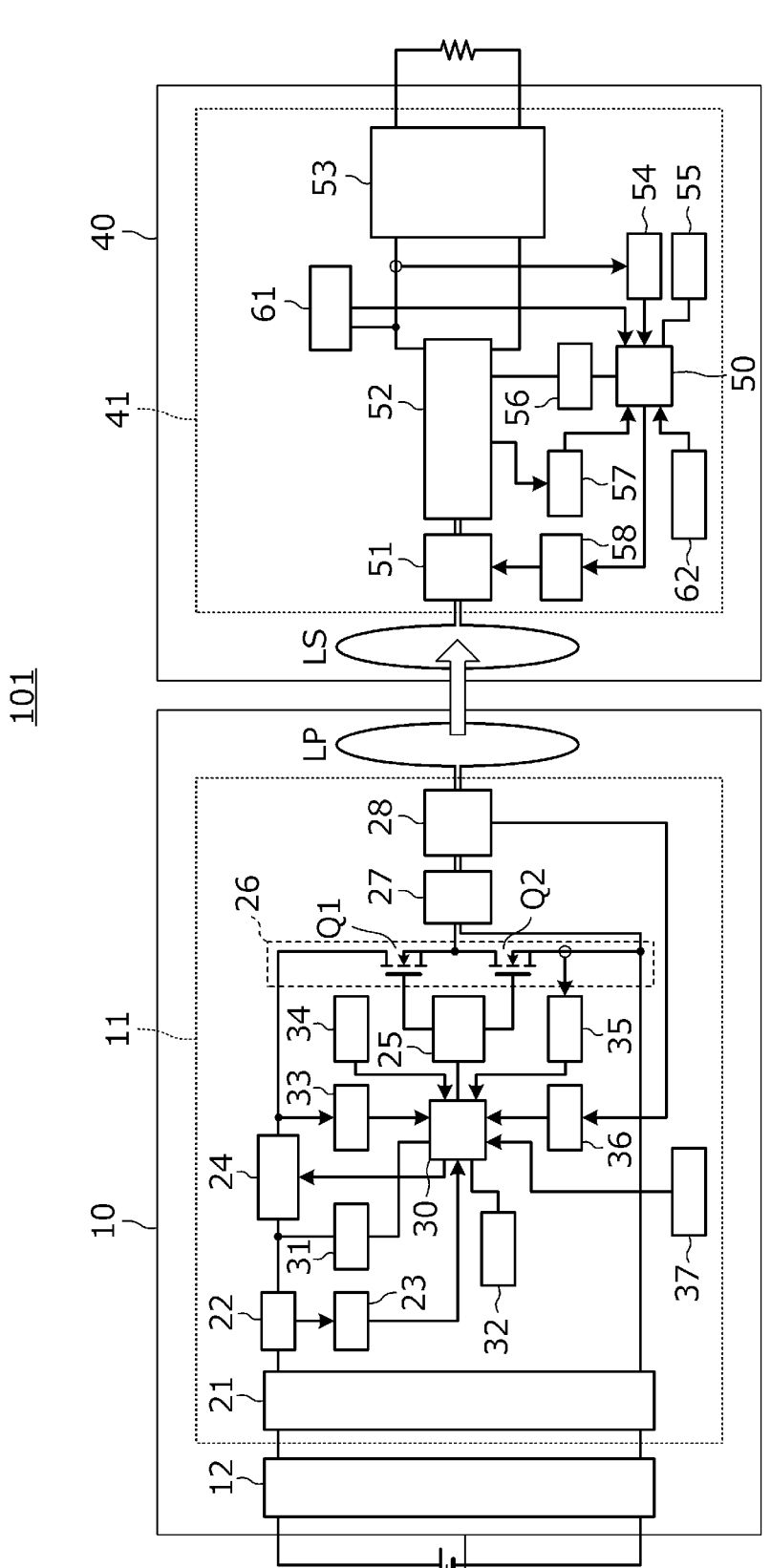
FIG. 1 is a block diagram illustrating a configuration of a wireless power transfer system according to an embodiment of the present disclosure.

FIG. 1 is a block diagram illustrating a configuration of a wireless power transfer system 101 according to an embodiment of the present disclosure. This wireless power transfer system 101 is made up of a power transmission device 10 and a power reception device 40 including a power reception coil Ls that wirelessly magnetically couples with a power transmission coil Lp included in that the power transmission device 10.

The power transmission device 10 includes a power transmission circuit 11, a voltage conversion circuit 12, and the power transmission coil Lp. The power transmission circuit 11 includes a switching circuit 26 in which switch elements Q1 and Q2 perform switching operations, an input voltage adjustment circuit 24 that is electrically connected to the switching circuit 26 and adjusts an input voltage, and an MPU 30. This MPU 30 corresponds to a "digital control circuit" according to the present disclosure.

The power reception device 40 includes the power reception coil Ls and a power reception circuit 41. A load is connected to an output of the power reception circuit 41.

The voltage conversion circuit 12 of the power transmission device 10 converts a direct-current input power supply voltage into a predetermined voltage and inputs the predetermined voltage to the power transmission circuit 11. The MPU 30 in the power transmission circuit 11 is a digital control circuit that controls respective parts of the power transmission circuit 11. An input filter 21 in the power transmission circuit 11 removes a ripple component and a noise component. A current detection circuit 22 detects a current flowing through a line in order to detect a signal sent from the power reception device 40. A demodulation circuit 23 demodulates a signal from a current change detected by the current detection circuit 22 and inputs the demodulated signal to the MPU 30. The input voltage adjustment circuit 24 adjusts the voltage to be input to the switching circuit 26 by using a control signal output from the MPU 30. A driver 25 enables the switch elements Q1 and Q2 to perform switching by using the control signal from the MPU 30.

The switching circuit 26 includes the high side switch element Q1 and the low side switch element Q2 and turns ON/OFF in response to a gate signal from the driver 25. An EMI filter 27 suppress a noise component that causes electromagnetic interference. A resonance adjustment circuit 28 includes a power transmission resonance capacitor, forms a resonance circuit together with the power transmission coil Lp, and adjusts a resonant frequency thereof.

A voltage regulator circuit 31 supplies a power supply voltage to the MPU 30. An oscillator 32 provides a clock signal to the MPU 30.

An overvoltage protection circuit 33 detects whether or not the voltage supplied to the switching circuit 26 is overvoltage and inputs its result to the MPU 30. An overheat protection circuit 34 detects whether or not the temperatures of the switch elements Q1 and Q2 are in an overheat state and inputs its result to the MPU 30. An overcurrent protection circuit 35 detects whether or not the current flowing through the switching circuit 26 is overcurrent and inputs its result to the MPU 30. An overpower protection circuit 36 detects whether or not the transmission power is an excessive amount of power in accordance with the voltage generated at the resonance adjustment circuit 28 and inputs its result to the MPU 30.

A communication port 37 is a communication port to be connected with a circuit outside the power transmission circuit 11, and the MPU 30 communicates with an external device via this communication port 37.

An MPU 50 in the power reception circuit 41 controls respective parts of the power reception circuit 41. A power reception resonance adjustment circuit 51 includes a power reception resonance capacitor, forms a resonance circuit together with the power reception coil Ls, and adjusts a resonant frequency thereof. A rectifying and smoothing circuit 52 performs rectification and smoothing on the voltage generated at a power reception resonance circuit formed from the power reception coil Ls and the power reception resonance adjustment circuit 51 and inputs the resultant voltage to a voltage conversion circuit 53. The voltage conversion circuit 53 converts the output voltage of the rectifying and smoothing circuit 52 into a prescribed voltage and supplies to a load.

An overpower protection circuit 54 detects whether or not the power supplied to the load is overload based on the current input to the voltage conversion circuit 53 and inputs its result to the MPU 50. An oscillator 55 provides a clock signal to the MPU 50. A voltage regulator circuit 56 supplies a power supply voltage to the MPU 50. An overvoltage protection circuit 57 detects whether or not the output voltage of the rectifying and smoothing circuit 52 is overvoltage and inputs its result to the MPU 50. A modulation circuit 58 modulates a power reception resonance adjustment circuit 51. By modulating the power reception resonance adjustment circuit 51 via the modulation circuit 58, the MPU 50 sends a predetermined signal to the power transmission circuit 11.

A power reception voltage detection circuit 61 detects the output voltage of the rectifying and smoothing circuit 52 and inputs the detected voltage to the MPU 50. A temperature detection circuit 62 detects the temperature of the power reception circuit 41 and inputs the detected temperature to the MPU 50.

The power reception device 40 presents the power requirement to the power transmission device 10 by changing the state of power reception by using the foregoing modulation circuit 58 modulating the power reception resonance adjustment circuit 51 or the rectifying and smoothing circuit 52. Further, the power transmission device 10 recognizes the power requirement presented by the power reception device 40 by performing a control that detects the current by using the current detection circuit 22 and demodulates a detected current change by using the demodulation circuit 23. As described above, it becomes possible to provide a wireless power transfer system in which a power transmission device or a power reception device does not necessarily include a communication device and the power transmission device transmits the power having high quality and high accuracy in accordance with a power requirement presented by the power reception device.

Figure 2:
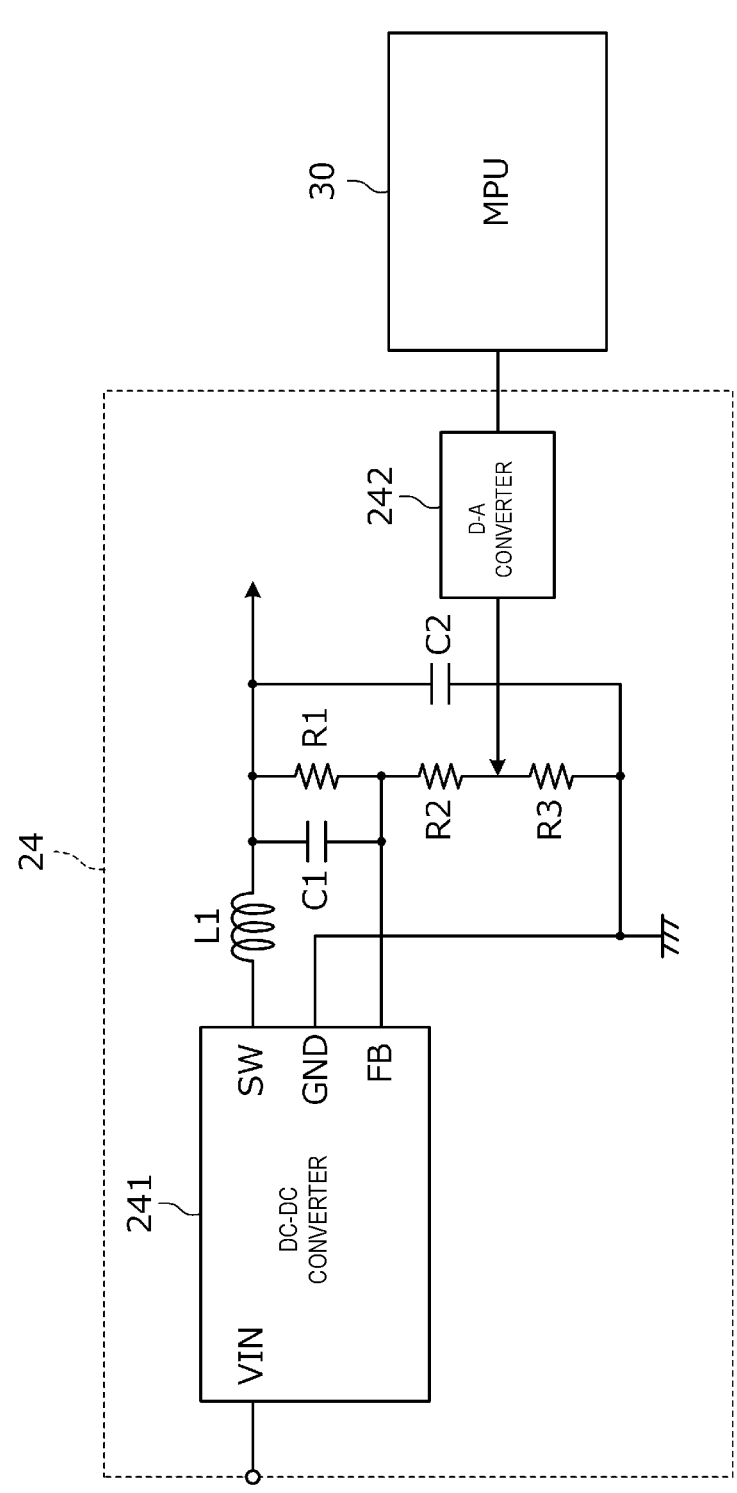
FIG. 2 is a diagram illustrating a configuration of an input voltage adjustment circuit and an MPU illustrated in FIG. 1.

FIG. 2 is a diagram illustrating a configuration of the input voltage adjustment circuit 24 and the MPU 30 illustrated in FIG. 1.

The input voltage adjustment circuit 24 includes a DC-DC converter 241, a D-A converter 242, and an LCR circuit illustrated in FIG. 2.

The DC-DC converter 241 converts an input voltage input to a VIN terminal and outputs the converted voltage from a SW terminal to the switching circuit 26 via an inductor L1. The DC-DC converter 241 outputs a voltage associated with a feedback voltage of a feedback terminal FB from the SW terminal. A supply voltage to the switching circuit 26 is divided by resistors R1, R2, and R3, and that divided voltage is fed back to the feedback terminal FB. Because of this, the output voltage of the DC-DC converter 241 is stabilized at a prescribed voltage.

The D-A converter 242 converts a control signal provided from the MPU 30 into an analog voltage and applies the voltage as a bias voltage for the resistive voltage division circuit. Accordingly, the feedback voltage for the feedback terminal FB of the DC-DC converter 241 is controlled based on the output voltage of the D-A converter 242.

Figures 3, 4, 5:
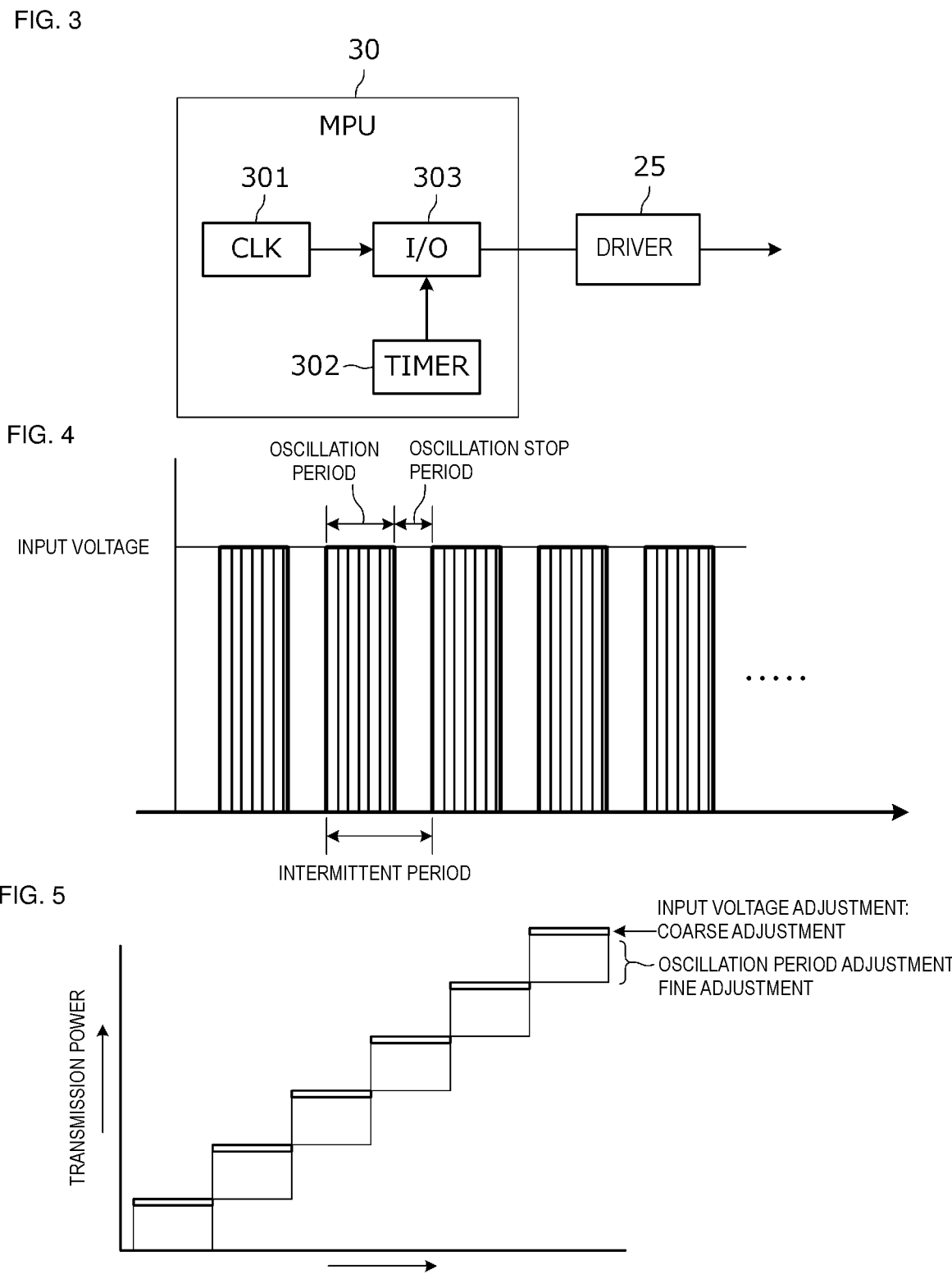
FIG. 3 is a diagram illustrating an internal configuration of the MPU pertaining to control of an intermittent oscillation of a switching circuit.
FIG. 4 is a waveform diagram of a switching signal for a switching circuit, which is output from a driver illustrated in FIG. 3.
FIG. 5 is a diagram illustrating a setting example of wireless transmission power.

FIG. 3 is a diagram illustrating an internal configuration of the MPU 30 pertaining to control of an intermittent oscillation of the switching circuit 26. The MPU 30 includes a clock signal generation circuit 301, an I/O port 303 that outputs its clock signal to the driver 25 of the switching circuit 26, and a timer circuit 302 that provides an output/ stop control signal to this I/O port 303.

FIG. 4 is a waveform diagram of a switching signal for the switching circuit 26, which is output from the driver 25 illustrated in FIG. 3. In FIG. 4, the input voltage is a voltage to be input to the switching circuit 26 from the DC-DC converter 241 illustrated in FIG. 2. Further, "oscillation period" is an output period of the I/O port 303, and "oscillation stop period" is a stop period of the I/O port 303. These oscillation period and oscillation stop period are repeated at an intermittent cycle. The oscillation frequency of the clock signal generation circuit 301 illustrated in FIG. 3 is, for example, 6.78 MHz.

The power being transmitted wirelessly from the power transmission device 10 changes depending on the foregoing input voltage and depending on the ratio of the oscillation period to the intermittent cycle. However, the MPU 30 has the control capability of adjusting the input voltage in such a way that the oscillation stop period of the intermittent oscillation does not exceed a predetermined stop period.

By setting a predetermined limit on the foregoing oscillation stop period of the intermittent oscillation, it becomes possible to suppress a large change of the power reception voltage at each foregoing intermittent cycle caused by having an unusually long oscillation stop period.

Particularly, it is preferable that the foregoing predetermined oscillation stop period is shorter than a retention period of the power reception voltage in the power reception device described above. This can avoid a problem of not being able to maintain the power reception voltage in the form of direct-current because of large ripples in the output voltage of the rectifying and smoothing circuit 52 in the power reception device 40 illustrated in FIG. 1.

Further, the MPU 30 sets an upper limit of the intermittent cycle of the intermittent oscillation. This can suppress a large change of the power reception voltage at each foregoing intermittent cycle caused by having a longer oscillation stop period, and can retain or maintain the reception power during the oscillation stop period. Further, the MPU 30 sets a lower limit of the intermittent cycle of the intermittent oscillation. This can avoid a problem of having an exceedingly large transmission power, a problem of increasing electromagnetic noise, or the like, which is caused because the intermittent cycle is too short.

Based on the power requirement from the power reception device 40, the power transmission device 10 illustrated in FIG. 1 controls the wireless transfer power by setting the foregoing input voltage and by setting the ratio of the oscillation period to the intermittent cycle.

FIG. 5 is a diagram illustrating a setting example of wireless transmission power. The horizontal axis is the setting of the input voltage, and the vertical axis is the magnitude of the transmission power resulted by the foregoing input voltage adjustment and the foregoing oscillation period adjustment. In FIG. 5, the thick line denotes the transmission power at respective states where the input voltage is switched between plural stages. The area extending downward from the thick line denotes the range of change in the transmission power resulted by the adjustment of the oscillation period.

In this example illustrated in FIG. 5, a stepwise coarse adjustment of the transmission power is performed by switching the input voltage, and a fine adjustment of the transmission power is performed by finely adjusting the oscillation period.

As described above, it becomes possible to set the transmission power in a high-resolution manner over a wide range by coarsely adjusting the transmission power by switching the input voltage (voltage to be input to the switching circuit 26 from the DC-DC converter 241) and finely adjusting the transmission power by adjusting the oscillation period.

Figure 6:
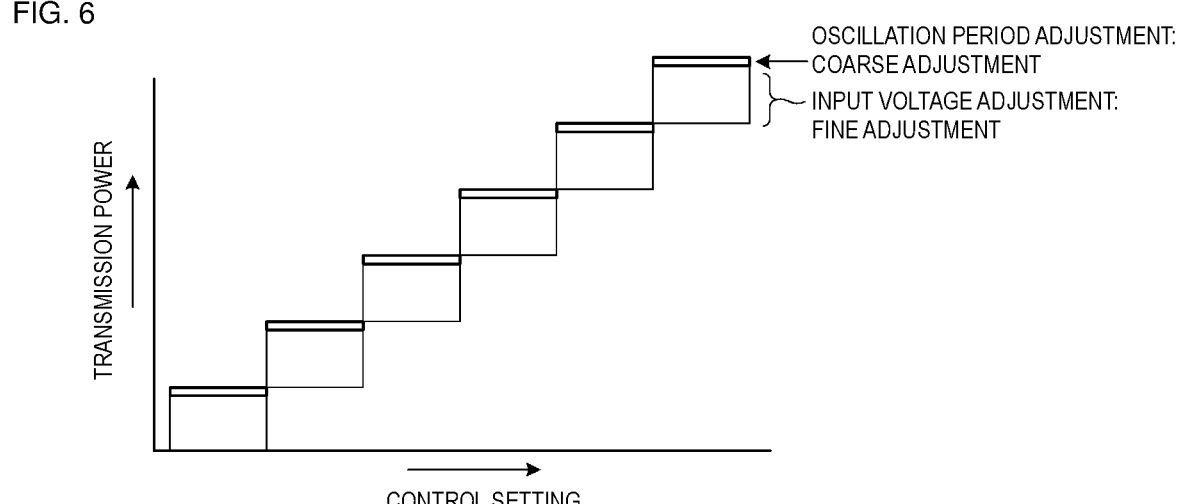
FIG. 6 is a diagram illustrating another setting example of the wireless transmission power.

FIG. 6 is a diagram illustrating another setting example of the wireless transmission power. The horizontal axis is the setting of the oscillation period, and the vertical axis is the magnitude of the transmission power resulted by the foregoing input voltage adjustment and the foregoing oscillation period adjustment. In FIG. 6, the thick line denotes the transmission power at respective states where the oscillation period is switched between plural stages. The area extending downward from the thick line denotes the range of change in the transmission power resulted by the adjustment of input voltage.

In this example illustrated in FIG. 6, a stepwise coarse adjustment of the transmission power is performed by switching the oscillation period, and a fine adjustment of the transmission power is performed by finely adjusting the input voltage.

As described above, it becomes possible to set the transmission power in a high-resolution manner over a wide range by coarsely adjusting the transmission power by switching the oscillation period and finely adjusting the transmission power by adjusting the input voltage.

As described above, of the adjustment of the input voltage and the control of the intermittent oscillation, the one that has a larger increment of adjustment values of the transmission power for the power reception device 40 may be used to coarsely adjust the transmission power for the power reception device 40, and the one that has a smaller increment of adjustment values of the transmission power for the power reception device 40 may be used to finely adjust the transmission power for the power reception device 40.

Note that in the example illustrated in FIG. 5, the example is described in which the transmission power is adjusted in the decreasing direction by adjusting the oscillation period in the shortening direction from a reference value. Similarly, the transmission power can also be adjusted in the increasing direction by adjusting the oscillation period in the widening direction from the reference value.

Further, in the example illustrated in FIG. 6, the example is described in which the transmission power is adjusted in the decreasing direction by adjusting the input voltage in the shortening direction from a reference value. Similarly, the transmission power can also be adjusted in the increasing direction by adjusting the input voltage in the increasing direction from the reference value.

Figure 7:
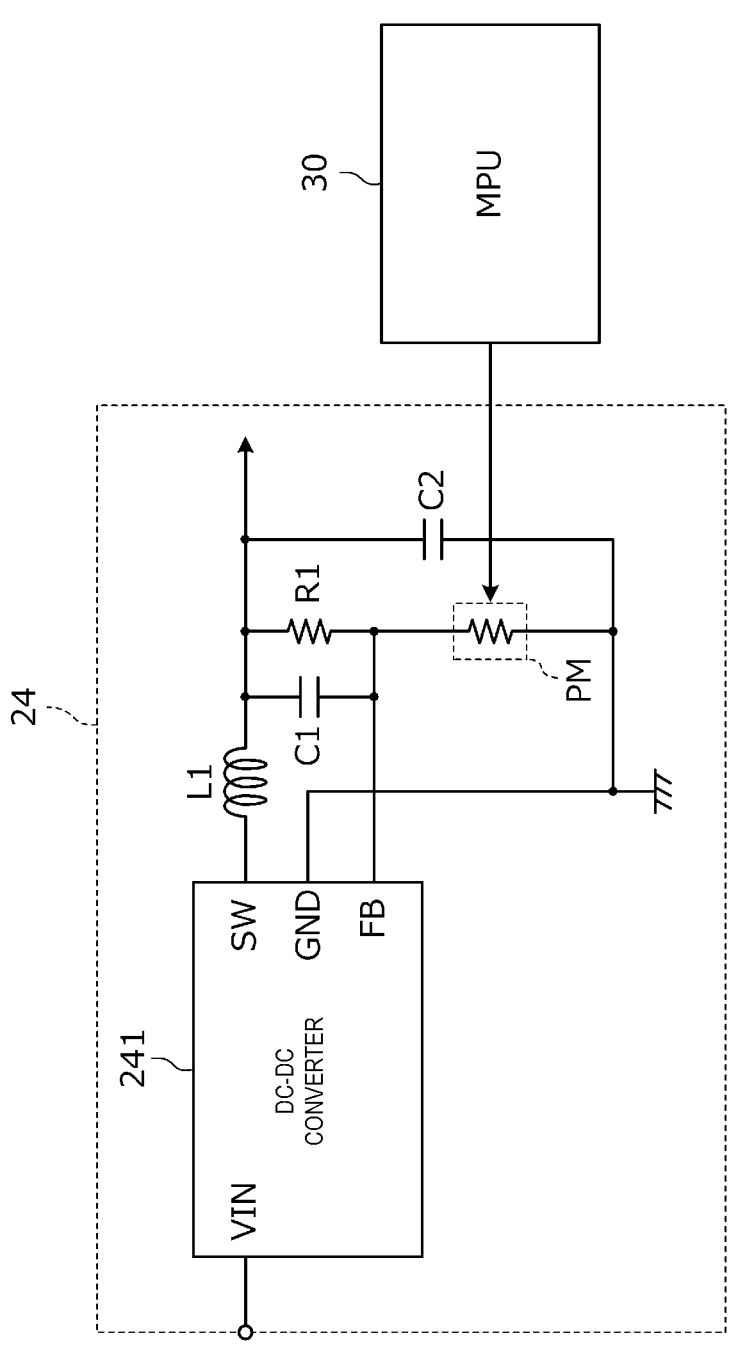
FIG. 7 is a diagram illustrating another configuration of the input voltage adjustment circuit and the MPU illustrated in FIG. 1.

FIG. 7 is a diagram illustrating another configuration of the input voltage adjustment circuit 24 and the MPU 30 illustrated in FIG. 1.

The input voltage adjustment circuit 24 includes the DC-DC converter 241 and an LCR circuit illustrated in FIG. 7. This example is different from the example illustrated in FIG. 2 in including a digital potentiometer PM and not including the D-A converter 242.

The DC-DC converter 241 converts the input voltage input to the VIN terminal and outputs the voltage from the SW terminal to the switching circuit 26 via the inductor L1. The DC-DC converter 241 outputs the voltage associated with the feedback voltage of the feedback terminal FB from the SW terminal. The supply voltage to the switching circuit 26 is divided by the resistor R1 and the digital potentiometer PM, and the divided voltage is fed back to the feedback terminal FB. This stabilizes the output voltage of the DC-DC converter 241 at the prescribed voltage.

The MPU 30 outputs a control signal to the digital potentiometer PM. The digital potentiometer PM has a resistance value associated with the control signal. Accordingly, the feedback voltage for the feedback terminal FB of the DC-DC converter 241 is controlled based on the control signal output from the MPU 30.

As described above, the feedback voltage of the feedback terminal FB of the DC-DC converter 241 may be directly controlled using a digital signal output from the MPU 30.

According to the present embodiment described above, the following actions and effects are produced.

It becomes possible to perform a highly accurate control of the transmission power by using a simple configuration without the need of using high resolution components.

It becomes possible to widen the range of adjustment of the transmission power by combining the adjustment of the intermittent oscillation and the adjustment of the input voltage, and further, it becomes possible to retain the output voltage in the power reception device 40 by setting the predetermined stop period.

By having the fine adjustment capability for the input voltage adjustment and the coarse adjustment capability for the oscillation period adjustment, it becomes possible to have a highly accurate resolution without depending on the resolution of the D-A converter 242 and the like. Further, this enables the control of transmission power in a high-resolution manner.

Finally, the present disclosure is not limited to the embodiments described above. For a person skilled in the art, modifications and alterations are possible if appropriate. The scope of the present disclosure is described by the claims and not by the embodiments described above. Furthermore, variations and alterations of the embodiments, which come within the range equivalent to the scope of the claims, are included in the scope of the present disclosure.

What is claimed is:

1. A wireless power transfer system comprising:
 a power transmission device; and
 a power reception device, the power reception device including a power reception coil that is configured to wirelessly magnetically couple with a power transmission coil included in the power transmission device, wherein the power transmission device includes a switching circuit in which a switch element is configured to perform a switching operation, an input voltage adjustment circuit that is electrically connected to the switching circuit and is configured to adjust an input voltage, and a digital control circuit, and the digital control circuit is configured to control the input voltage adjustment circuit and control of intermittent oscillation of the switching circuit in accordance with a power requirement from the power reception device, and is configured to adjust the input voltage to prevent an oscillation stop period of the intermittent oscillation from exceeding a predetermined stop period.

2. The wireless power transfer system according to claim 1, wherein
 the predetermined stop period is shorter than a retention period of power reception voltage in the power reception device.

3. The wireless power transfer system according to claim 1, wherein
 of the adjustment of the input voltage and the control of the intermittent oscillation, one that has a larger increment of adjustment values of a transmission power for the power reception device is used to coarsely adjust the transmission power for the power reception device, and one that has a smaller increment of adjustment values of the transmission power for the power reception device is used to finely adjust the transmission power for the power reception device.

4. The wireless power transfer system according to claim 1, wherein
 the input voltage adjustment circuit includes a DC-DC converter and a D-A converter, and
 the digital control circuit is configured to adjust the input voltage by providing an adjustment value to the D-A converter to change a feedback voltage for an output voltage of the DC-DC converter.

5. The wireless power transfer system according to claim 1, wherein
 the power reception device is configured to present the power requirement to the power transmission device by changing a state of power reception through modulation control, and
 the power transmission device is configured to recognize the power requirement through demodulation control that detects the power requirement.

6. The wireless power transfer system according to claim 1, wherein
 the digital control circuit is configured to set an upper limit of an intermittent cycle of the intermittent oscillation.

7. The wireless power transfer system according to claim 2, wherein
 of the adjustment of the input voltage and the control of the intermittent oscillation, one that has a larger increment of adjustment values of a transmission power for the power reception device is used to coarsely adjust the transmission power for the power reception device, and one that has a smaller increment of adjustment values of the transmission power for the power reception device is used to finely adjust the transmission power for the power reception device.

8. The wireless power transfer system according to claim 2, wherein the input voltage adjustment circuit includes a DC-DC converter and a D-A converter, and the digital control circuit is configured to adjust the input voltage by providing an adjustment value to the D-A converter to change a feedback voltage for an output voltage of the DC-DC converter.

9. The wireless power transfer system according to claim 3, wherein the input voltage adjustment circuit includes a DC-DC converter and a D-A converter, and the digital control circuit is configured to adjust the input voltage by providing an adjustment value to the D-A converter to change a feedback voltage for an output voltage of the DC-DC converter.

10. The wireless power transfer system according to claim 7, wherein the input voltage adjustment circuit includes a DC-DC converter and a D-A converter, and the digital control circuit is configured to adjust the input voltage by providing an adjustment value to the D-A converter to change a feedback voltage for an output voltage of the DC-DC converter.

11. The wireless power transfer system according to claim 2, wherein the power reception device is configured to present the power requirement to the power transmission device by changing a state of power reception through modulation control, and the power transmission device is configured to recognize the power requirement through demodulation control that detects the power requirement.

12. The wireless power transfer system according to claim 3, wherein the power reception device is configured to present the power requirement to the power transmission device by changing a state of power reception through modulation control, and the power transmission device is configured to recognize the power requirement through demodulation control that detects the power requirement.

13. The wireless power transfer system according to claim 4, wherein the power reception device is configured to present the power requirement to the power transmission device by changing a state of power reception through modulation control, and the power transmission device is configured to recognize the power requirement through demodulation control that detects the power requirement.

14. The wireless power transfer system according to claim 7, wherein the power reception device is configured to present the power requirement to the power transmission device by changing a state of power reception through modulation control, and the power transmission device is configured to recognize the power requirement through demodulation control that detects the power requirement.

15. The wireless power transfer system according to claim 8, wherein the power reception device is configured to present the power requirement to the power transmission device by changing a state of power reception through modulation control, and the power transmission device is configured to recognize the power requirement through demodulation control that detects the power requirement.

16. The wireless power transfer system according to claim 9, wherein the power reception device is configured to present the power requirement to the power transmission device by changing a state of power reception through modulation control, and the power transmission device is configured to recognize the power requirement through demodulation control that detects the power requirement.

17. The wireless power transfer system according to claim 10, wherein the power reception device is configured to present the power requirement to the power transmission device by changing a state of power reception through modulation control, and the power transmission device is configured to recognize the power requirement through demodulation control that detects the power requirement.

18. The wireless power transfer system according to claim 2, wherein the digital control circuit is configured to set an upper limit of an intermittent cycle of the intermittent oscillation.

19. The wireless power transfer system according to claim 3, wherein the digital control circuit is configured to set an upper limit of an intermittent cycle of the intermittent oscillation.

20. The wireless power transfer system according to claim 4, wherein the digital control circuit is configured to set an upper limit of an intermittent cycle of the intermittent oscillation.

* * * * *